Patented Dec. 8, 1925.

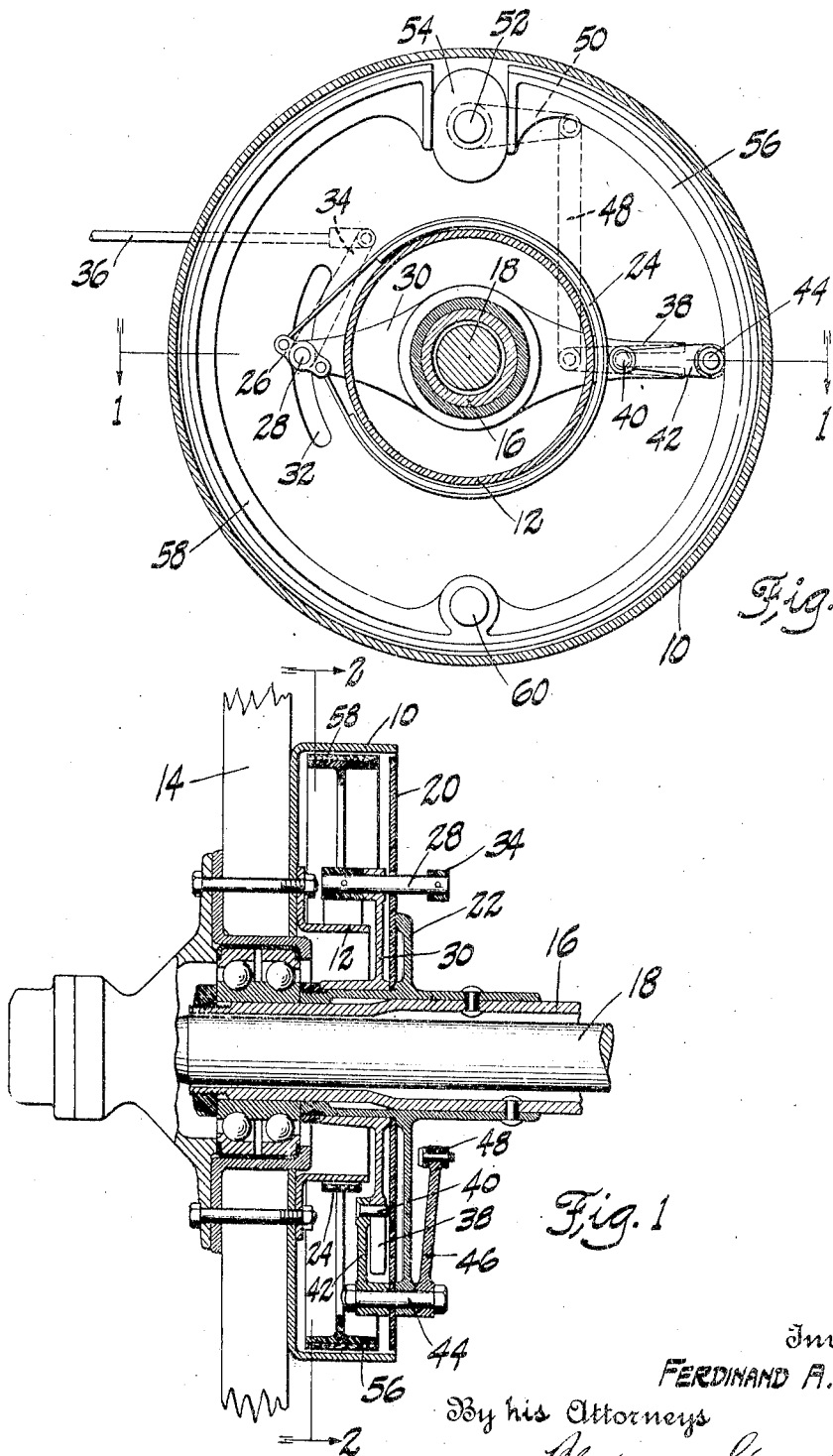

1,564,515

UNITED STATES PATENT OFFICE.

FERDINAND A. BOWER, OF FLINT, MICHIGAN, ASSIGNOR TO GENERAL MOTORS CORPORATION, OF DETROIT, MICHIGAN, A CORPORATION OF DELAWARE.

BOOSTER BRAKE.

Application filed September 21, 1923. Serial No. 664,067.

*To all whom it may concern:*

Be it known that I, FERDINAND A. BOWER, a citizen of the United States and a resident of Flint, county of Genesee, and State of Michigan, have invented certain new and useful Improvements in Booster Brakes, of which the following is a full, clear, concise, and exact description, such as will enable others skilled in the art to which the invention relates to make and use the same, reference being made therein to the accompanying drawings, which form a part of this specification.

This invention relates to booster brakes; i. e. brakes applied by power which is manually controlled, and is illustrated as embodied in a brake of this character which acts on the rear wheel of a motor vehicle.

An object of the invention is to arrange the parts of such a brake to secure a self-contained unit which may be substituted for a brake of any other type without necessitating any changes in the operating connections or in the vehicle itself. From this point of view the invention contemplates the use of inner and outer brake drums, which may be carried by the vehicle wheel and which are shown as concentrically arranged one within the other in substantially the same plane, in combination with a pair of braking devices or equivalent retarding means, one of which devices is controlled by the driver and has a limited movement with its drum to apply the other device to the other drum with a power which is a function of the power applied by the driver but which is greatly in excess thereof. By this arrangement the brakes are as sensitive to the driver's control as the usual manually applied brakes, while at the same time the driver is called on for very much less effort in applying the brakes.

Preferably the parts of the brake are enclosed within the outer drum and a plate closing its open end, so that the improved brakes are not materially different in external appearance from an internal expanding brake of any conventional type. In the arrangement shown in the drawings the connections from the brake pedal or lever contract an external band about the inner drum, the band moving angularly a short distance with its drum and turning its support or bracket to rock an arm connected to the bracket by a pin-and-slot joint to turn a cam which expands a pair of internal shoes against the outer drum. This arrangement is one which I consider desirable for motor vehicles in that the entire brake is very compact and all of the parts are enclosed and protected against dirt and oil.

The above and other objects and features of the invention, including various novel combinations of parts and desirable particular constructions, will be apparent from the following description of the illustrative embodiment shown in the accompanying drawings, in which:

Figure 1 is a section on the line 1—1 of Figure 2 showing the wheel and its axle and the improved brake in horizontal section; and Figure 2 is a section on the line 2—2 of Figure 1 showing the axle and brake drums in vertical section and the other parts of the brake in side elevation.

In the particular embodiment selected for illustration the brake drums 10 and 12 are carried by the rear wheel 14 of a motor vehicle, which wheel is shown as having a full-floating mounting on the rear axle housing 16 and as being driven by the driving axle 18. Most of the parts of the brake and its connections are enclosed between the outer drum 10 and a stationary plate 20 supported on the housing 16. Certain parts of the brake are supported by a stationary bracket or support 22 which may, if desired, be integral with the plate, but which is shown as being a separate member carried by the housing 16.

The inner drum 12 is arranged to be engaged by a driver-controlled angularly-movable brake device shown in the form of a contractable band 24, the ends of which are connected to a rock member 26 keyed to a spindle 28 carried by a support or bracket 30 which is mounted to have a limited angular movement about the axis of the housing 16. The spindle 28 extends through a slot 32 in the plate 20, and is operated to apply the brake by an arm 34 on its end which is connected by a link 36 to connections operated by the service brake pedal or the emergency brake lever or any equivalent driver-controlled operating device. At its opposite end the bracket 30 is provided with a slotted jaw 38 embracing a pin 40 carried by a rock arm 42 which is keyed to a short shaft 44 journaled in the plate 20 and the support 22, and to which is secured at its opposite end a rock arm 46 connected by a link 48 with an arm 50, which is arranged to rock a shaft 52 journaled in the plate 20 and which carries a cam 54 operating to expand a pair of shoes 56 and 58 against the inside of the outer drum 10. The shoes 56 and 58 are shown as being pivotally connected at 60, and if desired the pivotal connections 60 may pass through the plate 20 to form a brake of the "scissors" type.

In operation, depression of the brake pedal or manipulation of an equivalent controlling device by the driver rocks the member 26 to contract the band 24 into frictional engagement with the inner drum 12. Since the bracket 30 is free to move, within the limits defined by the arcuate slot 32 and until the friction of the band 24 against the drum 12 is balanced by the resistance of cam 54 to further turning movement, the band 24 will move with the drum 12 for a short distance, turning the support 30 about its axis. The slotted portion 38 of the support 30 thus rocks the arm 42, operating through the arm 46 and the link 48 to rock the arm 50 and the cam 54 to expand the shoes 56 and 58 against the outer drum 10. The brakes may be so adjusted that the braking effort of the band 24 is small as compared with the braking effect of the shoes 56 and 58, inasmuch as the braking effect of the band 24 is not balanced directly against that of the shoes 56 and 58 but is balanced through power-multiplying leverage connections against the resistance of the cam 54 to turning movement. Thus a powerful braking action may be brought about by a comparatively small application of power by the driver; but this action is nevertheless a function of the power applied by the driver, so that he may graduate the braking effect accurately by varying the power which he himself applies.

While I have illustrated and described one particular embodiment of my invention, it is not my intention to limit its scope to that embodiment or otherwise than by the terms of the appended claims. The term "drum" throughout the specification and claims is intended as a convenient designation of a member of any form having a motion which is to be retarded, except where this term is in some way specifically limited to a particular form of drum.

I claim:

1. A vehicle comprising, in combination, a wheel having inner and outer brake drums, a contractable external braking device encircling the inner drum, an expansible braking device within the outer drum and movable into frictional engagement therewith, one of said devices having a limited movement with its drum, driver controlled means for applying the movable braking device to its drum, and a connection operated by movement thereof for applying the other braking device to the other drum.

2. A vehicle comprising, in combination, a wheel having inner and outer brake drums, a contractable band encircling the inner drum and arranged to have a limited angular movement therewith, driver controlled means for contracting the band into frictional engagement with the drum, an expansible braking device arranged within the outer drum, and a connection operated by angular movement of said band for expanding the braking device into frictional engagement with the outer drum.

3. A vehicle comprising, in combination, a wheel having inner and outer brake drums, an angularly movable band contractable under the control of the driver into frictional engagement with the inner drum, expansible brake shoes arranged within the outer drum, a cam for expanding the shoes, and a connection operated by angular movement of the band for rocking the cam to expand the shoes into frictional engagement with the outer drum.

4. A vehicle comprising, in combination, a wheel having inner and outer brake drums, a wheel support carrying an angularly movable bracket, a contractable band supported by the bracket and encircling the inner drum, driver controlled means for contracting the band, a braking device operating on the outer drum, and a connection for applying the braking device to the outer drum including an arm having a pin-and-slot connection with the bracket to be operated by angular movement thereof.

5. A vehicle comprising, in combination, a wheel having inner and outer open ended brake drums, a stationarily supported plate substantially closing the open ends of the drums, an angularly movable support enclosed between the plate and the outer drum, a braking device carried by the angularly movable support, driver controlled means for applying the device to the inner drum, a braking device movable into frictional engagement with the outer drum, and connections operated by angular movement of the support for moving the braking device against the other drum, said connections including an arm mounted on the plate which has a pin-and-slot connection with the angularly movable support.

In testimony whereof I affix my signature.

FERDINAND A. BOWER.